United States Patent
Irie

(10) Patent No.: US 6,670,992 B2
(45) Date of Patent: *Dec. 30, 2003

(54) CAMERA HAVING LIGHT MEASURING DEVICE OPERABLE BASED ON FOCUS DETECTING DEVICE

(75) Inventor: Yoshiaki Irie, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/070,788

(22) Filed: May 1, 1998

(65) Prior Publication Data
US 2003/0179310 A1 Sep. 25, 2003

(30) Foreign Application Priority Data
May 12, 1997 (JP) .............................................. 9-120824

(51) Int. Cl.$^7$ ........................... H04N 5/232; G03B 3/10; G03B 13/00
(52) U.S. Cl. ........................ 348/350; 348/345; 396/123
(58) Field of Search ................................. 348/345, 346, 348/348, 349, 350, 353, 354, 221, 362, 207, 221.1, 207.99; 396/51, 61, 63, 65, 80, 89, 102, 103, 104, 123, 122, 121, 234, 233, 271, 373

(56) References Cited

U.S. PATENT DOCUMENTS

| | | | | |
|---|---|---|---|---|
| 5,041,859 A | * | 8/1991 | Ishiguro et al. | 396/123 |
| 5,258,803 A | * | 11/1993 | Hayakawa | 396/123 |
| 5,313,246 A | * | 5/1994 | Takagi et al. | 396/122 |
| 5,392,091 A | * | 2/1995 | Iwasaki | 396/234 |
| 5,410,383 A | * | 4/1995 | Kusaka et al. | 396/122 |
| 5,485,241 A | | 1/1996 | Irie et al. | |
| 5,541,400 A | | 7/1996 | Hagiwara et al. | |
| 5,579,080 A | | 11/1996 | Irie et al. | |
| 5,589,908 A | | 12/1996 | Irie | |
| 5,600,399 A | | 2/1997 | Yamada et al. | |
| 5,634,141 A | | 5/1997 | Akashi et al. | |
| 5,752,090 A | | 5/1998 | Nagano et al. | |
| 5,797,046 A | | 8/1998 | Nagano et al. | |
| 6,067,115 A | * | 5/2000 | Suda | 348/350 |
| 6,088,060 A | * | 7/2000 | Suda et al. | 348/350 |
| 6,124,890 A | * | 9/2000 | Muramoto | 348/350 |
| 6,154,253 A | * | 11/2000 | Kiri et al. | 348/350 |

FOREIGN PATENT DOCUMENTS

| | | |
|---|---|---|
| JP | 3-223825 | 10/1991 |
| JP | 5-53169 | 3/1993 |

* cited by examiner

Primary Examiner—Aung S. Moe
(74) Attorney, Agent, or Firm—Fitzpatrick, Cella, Harper & Scinto

(57) ABSTRACT

In a camera including a light measuring device having a plurality of light measuring areas into which a light measuring field is divided, and a focus detecting device having a plurality of focus detecting areas which are set at a plurality of places including a place on a boundary between the plurality of light measuring areas, the focus detecting device is arranged to select a particular focus detecting area from among the plurality of focus detecting areas, and a deciding circuit decides a light measuring area which is to be subjected to a specific weighting, from among the plurality off light measuring areas by using a focus detecting state of each of the particular focus detecting area and focus detecting areas adjacent thereto if the particular focus detecting area lies on the boundary between the plurality of light measuring areas.

11 Claims, 7 Drawing Sheets

CAMERA HAVING LIGHT MEASURING DEVICE OPERABLE BASED ON FOCUS DETECTING DEVICE

BACKGROUND OF THE INVENTION

1. Field of the Invention

The present invention relates to a camera of the kind which measures light with a light measuring field divided into a plurality of areas.

2. Description of Related Art

Various kinds of cameras have been provided that divide a photo-taking field into a plurality of areas and appositely perform an exposure action on a photo-taking image plane using a luminance signal obtained for each of the divided areas. For example, a camera disclosed in Japanese Laid-Open Patent Application No. HEI 3-223825 is arranged to detect luminance for every one of a plurality of light measuring areas, to select at least one focus detecting area from among a plurality of focus detecting areas for which focus is detectable independent of each other, to group a plurality of light measuring areas in a circular shape around and coaxially with the selected focus detecting area and to compute a measured light value of the whole photo-taking field by variably weighting the average luminance value of these grouped light measuring areas.

Another camera disclosed in Japanese Laid-Open Patent Application No. HEI 5-53169 is arranged to obtain an object position within a photo-taking field by detecting, for example, the position of the visual line of the camera operator, to divide and group many pixels (picture elements) of a light measuring CCD image sensor into a plurality of patterns in accordance with a dividing pattern which is flexibly variable according to the object position detected, and to obtain a measured light value by weighting the average luminance value of each of these pattern groups.

In order to take a shot with an amount of exposure most apposite to a photo-taking field, it is a trend to obtain luminance information as much as possible from the photo-taking field by dividing the areas of a light measuring sensor into many areas. Divided light measuring patterns most apposite to a photo-taking object is obtainable using an area sensor such as a CCD in a manner, for example, as disclosed in the above Japanese Laid-Open Patent Application No. HEI 5-53169. However, the area sensor is not only expensive but also has a drawback with respect to its response for a low luminance object, because it is an electric-charge storing type sensor. In view of this drawback, a light measuring sensor of photodiode type is widely in use.

However, an increase in the number of divisions of the photodiode-type light measuring sensor results in a smaller light receiving area of each divided area. The smaller light measuring area eventually lowers the light measuring ability of the light measuring sensor.

Therefore, a light measuring sensor having some number of divided parts of certain sizes can generally be considered to be more easily usable with respect to the light measuring capability for a low luminance and capability for a light measuring arithmetic process than the use of, as a light measuring sensor, an area sensor composed of an aggregation of minute pixel sensors in which many finely divided patterns can be arbitrarily formed.

Meanwhile, cameras are arranged to perform a focus detecting action for the purpose of adjusting the focus of a photo-taking lens to a photo-taking object. It is also a general trend to divide a focus detecting sensor used for this purpose into many parts, or areas. With two area sensors employed for this purpose, for example, the focus for many areas within a photo-taking image plane can be detected by dividing pixels of these area sensors and by obtaining correlation between the divided pixels according to a known phase-difference detecting method.

As regards known methods for arranging cameras with respect to the relation between a light measuring area and a distance measuring area (focus detecting area), such as the camera disclosed in the above Japanese Laid-Open Patent Application No. HEI 3-223825, these cameras are arranged to have a fewer number of focus detecting areas than the number of light measuring areas. Therefore, it is possible to set each focus detecting area approximately in a barycenter position of the light measuring area which includes that focus detecting area. In the case of each of these cameras, therefore, an approximately apposite exposure can be made by carrying out a light measuring arithmetic operation with some suitable weighting on the assumption that a light measuring area corresponding to a focus detecting area for which focus is to be detected corresponds to the position of a main photo-taking object.

However, in a case where a camera is arranged to have a number of divided focus detecting areas equal to or more than that of light measuring areas, it becomes difficult to set a focus detecting area where a focusing action is to be performed on a main photo-taking object approximately in the barycenter position of a light measuring area. In such a case, it becomes difficult to select only one of the light measuring areas corresponding to a main photo-taking object position on which a light measuring arithmetic operation is to be carried out. Thus, it becomes impossible to accurately determine an exposure setting for the photo-taking object because of an optical discrepancy.

Such an optical discrepancy which is, so to speak, the parallax of a focus detecting area and a light measuring area, results from a discrepancy in shape of sensor layout between a focus detecting sensor and a light measuring sensor or from a problem related to optical arrangement. FIG. 3 shows, by way of example, such a discrepancy. In the case of FIG. 3, focus detecting areas 71, 73, 75 and 77, which are included in a group of focus detecting areas 70 to 78, are respectively located on boundaries of a plurality of light measuring areas S0 to S4.

BRIEF SUMMARY OF THE INVENTION

In accordance with an aspect of the invention, in a camera in which a plurality of light measuring areas and a plurality of focusing detecting areas are provided, and a particular light measuring area to be subjected to a large weighting is selected according to selection of one of the focus detecting areas, if a focus detecting area located on a boundary between light measuring areas is selected, the particular light measuring area to be subjected to a large weighting is selected using focus detecting states of other focus detecting areas adjacent to the selected focus detecting area.

The above and other aspects and features of the present invention will become apparent from the following detailed description of preferred embodiments thereof taken in connection with the accompanying drawings.

DETAILED DESCRIPTION OF THE PREFERRED EMBODIMENTS

Hereinafter, preferred embodiments of the invention will be described in detail with reference to the drawings.

First Embodiment

Figure 1:
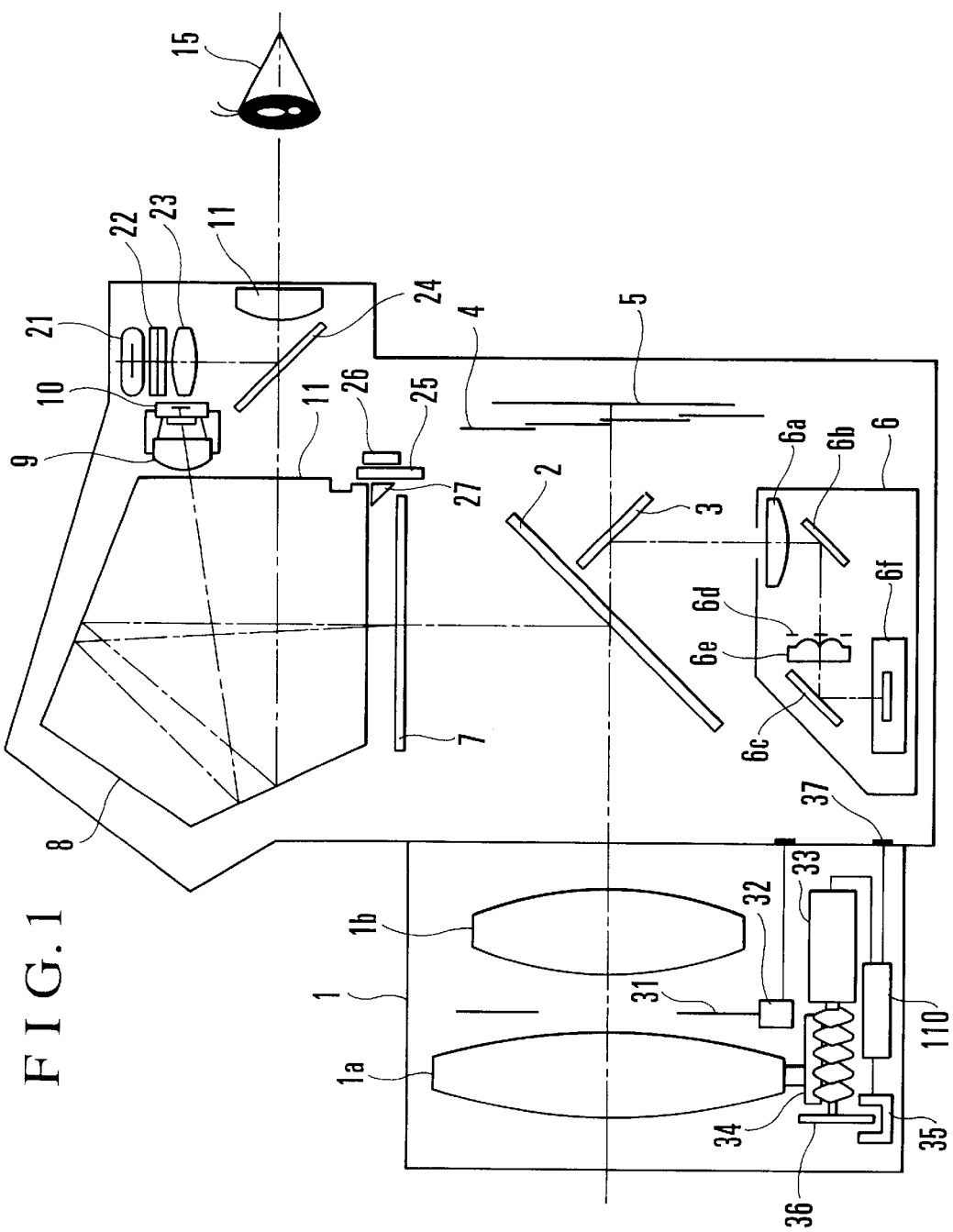
FIG. 1 is a schematic illustration showing a single-lens reflex camera according to a first embodiment of the present invention.

FIGS. 1 to 6 show a single-lens reflex camera according to a first embodiment of the present invention. In FIG. 1, reference numeral 1 denotes a photo-taking lens. While the illustration shows only two lenses 1a and 1b, the photo-taking lens 1 includes other lenses. A main mirror 2 is arranged obliquely with respect to a photo-taking optical path and is retractable away from the optical path according to a change from a viewfinder observing state to a photo-taking state. A sub-mirror 3 is arranged to reflect a light flux passing through the main mirror 2 toward a lower part of the camera body.

Reference numeral 4 denotes a shutter, ;and reference numeral 5 denotes a photosensitive member which is a silver-halide film, a CCD or MOS type solid-state image sensor or a camera tube such as a vidicon. A focus detecting part 6 is composed of a field lens 6a disposed in the neighborhood of an image forming plane, reflection mirrors 6b and 6c, a secondary image forming lens 6e, a stop 6d, and a line sensor 6f which is composed of a plurality of CCDs.

Figure 3:
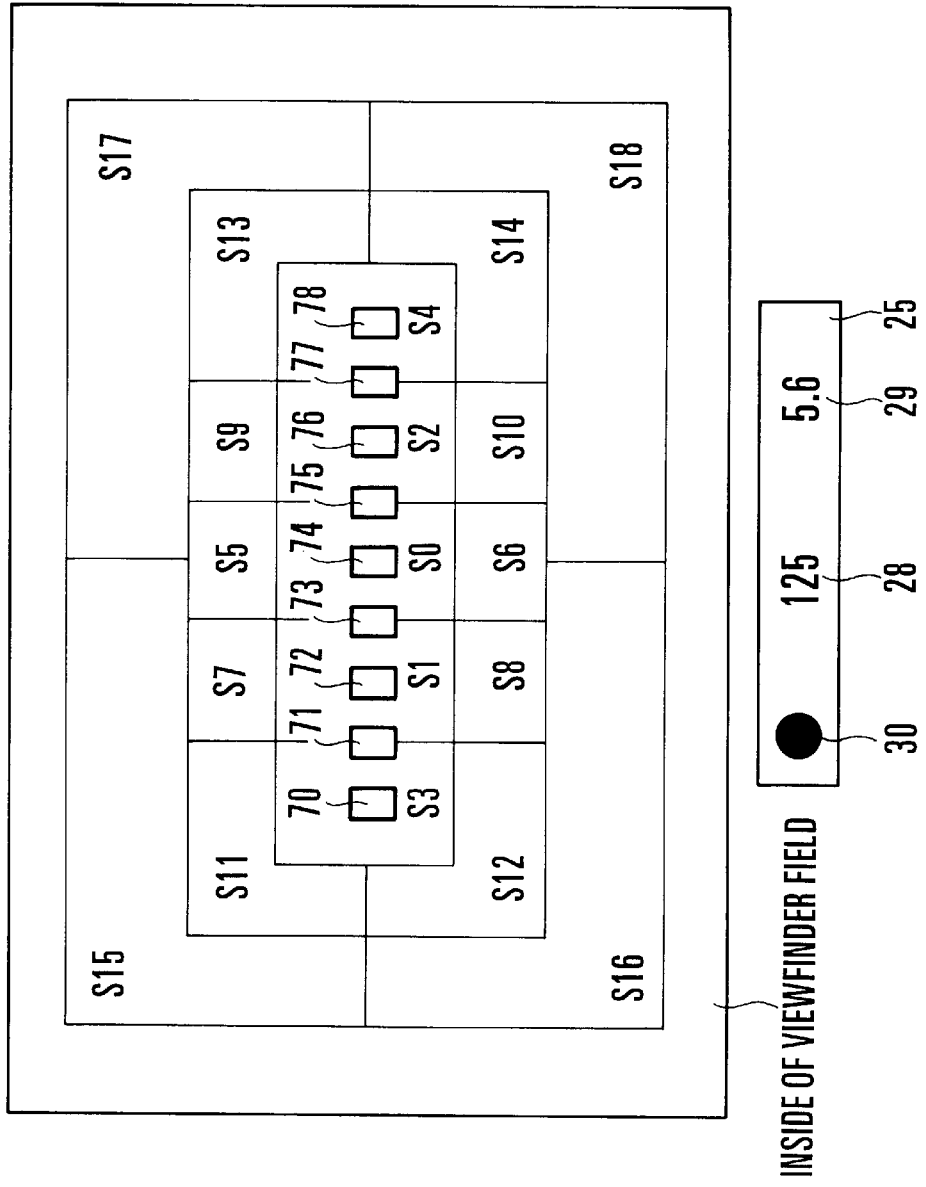
FIG. 3 shows a viewfinder field of the camera.

In the first embodiment, the focus detecting part is arranged to perform focus detection using a known phase-difference detecting method. Referring to FIG. 3, which shows a viewfinder field, a focus detecting action is possible for each of focus detecting areas 70 to 78, which are separately arranged within a photo-taking field.

Referring again to FIG. 1, a focusing screen 7 is disposed on a prescribed image forming plane of the photo-taking lens 1. A pentagonal prism 8 is arranged to turn an optical path formed for the viewfinder.

An image forming lens 9 and a light measuring sensor 10 are provided for measuring the luminance of a photo-taking object located within the field. The image forming lens 9 is arranged to make the focusing screen 7 and the light measuring sensor 10 conjugate to each other through a reflection optical path within the pentagonal prism 8.

The light measuring sensor 10 is a nineteen-divided sensor composed of nineteen area sensors (SPC-0 to SPC-18 shown in the block diagram of FIG. 2) which are arranged to respectively measure the luminance values of nineteen light measuring areas S0 to S18 obtained by dividing the inside of the field, as shown in FIG. 3. Further, as shown in FIG. 3, among the focus detecting areas 70 to 78, the focus detecting areas 70, 72, 74, 76 and 78 are located respectively at about the barycenters of the light measuring areas S3, S1, S0, S2 and S4. The focus detecting areas 71, 73, 75 and 77 are respectively located on boundaries between the light measuring areas S3 and S1, between the light measuring areas S1 and S0, between the light measuring areas S0 and S2 and between the light measuring areas S2 and S4. Incidentally, the boundary lines of the light measuring areas within the viewfinder field shown in FIG. 3 are virtual lines obtained by projecting the divided state of the light measuring sensor 10 on the viewfinder and are invisible in actuality.

An eyepiece 11 is arranged in the rear of the exit pupil of the pentagonal prism 8 to be used for observing the focusing screen 7 by the eye of the camera operator. A viewfinder optical system is thus composed of the main mirror 2, the focusing screen 7, the pentagonal prism 8 and the eyepiece 11.

A high luminance LED (hereinafter referred to as SI-LED) 21 is arranged to emit a red light which has a center frequency of 680 nanometers and is visible even in a bright object. An LCD (hereinafter referred to as SI-LCD) 22 is formed by patterning the positions of the above-stated nine focus detecting areas 70 to 78, and is arranged to turn only the pattern of an LCD part which corresponds to the position of a selected focus detecting area into a transmissive state. The light emitted from the SI-LED 21 disposed at the rear of the SI-LCD 22 passes only through the transmissive pattern of the SI-LCD 22. After that, the light comes to an eyeball of the operator through a light projecting lens 23 and a dichroic mirror 24, thereby enabling the operator to see the focus detecting area display pattern on the viewfinder field. In other words, as is apparent from the viewfinder field shown in FIG. 3, at least one of patterns corresponding respectively to the focus detecting areas 70 to 78 lights up within the viewfinder field to show a selected focus detecting area.

The dichroic mirror 24 has a characteristic of reflecting the light of wavelengths equal to and above 680 nanometers and is thus arranged to efficiently guide the light of the SI-LED 21 to the eye of the operator and also to let the operator see as a viewfinder field image a light coming from the photo-taking lens 1 with almost no decrease in light quantity.

An intra-viewfinder LCD (hereinafter referred to as F-LCD) 25 is arranged to display photographic data outside of the viewfinder field and to be illuminated by an illuminating LED (hereinafter referred to as F-LED) 26. A light emitted by the F-LED 26 passes through the F-LCD 25 to be guided by a triangular prism 27 to the outside of the viewfinder field as shown in FIG. 3. This display enables the operator to know photographic information of varied kinds. In FIG. 3, reference numeral 28 denotes a shutter speed display, reference numeral 29 denotes an aperture value display, and reference numeral 30 denotes an in-focus mark indicative of an in-focus state of the photo-taking lens 1.

The photo-taking lens 1 shown in FIG. 1 contains a diaphragm 31, a diaphragm driving device 32, which has a diaphragm driving circuit 111 arranged therein (see, FIG. 2), a lens driving motor 33, and a lens driving member 34, which is composed of a driving gear, etc.

A photo-coupler 35 is arranged to detect the rotation of a pulse disk 36, which is rotatably interlocked with the lens driving member 34. The rotation thus detected is transmitted to a focus adjustment circuit 110. The focus adjustment circuit 110 is arranged to cause the photo-taking lens 1 to be moved to an in-focus position by driving a lens driving motor 33 by a predetermined amount. A mount contact 37 is arranged in a known manner to serve as an interface between the camera body and the photo-taking lens 1.

Figure 2:
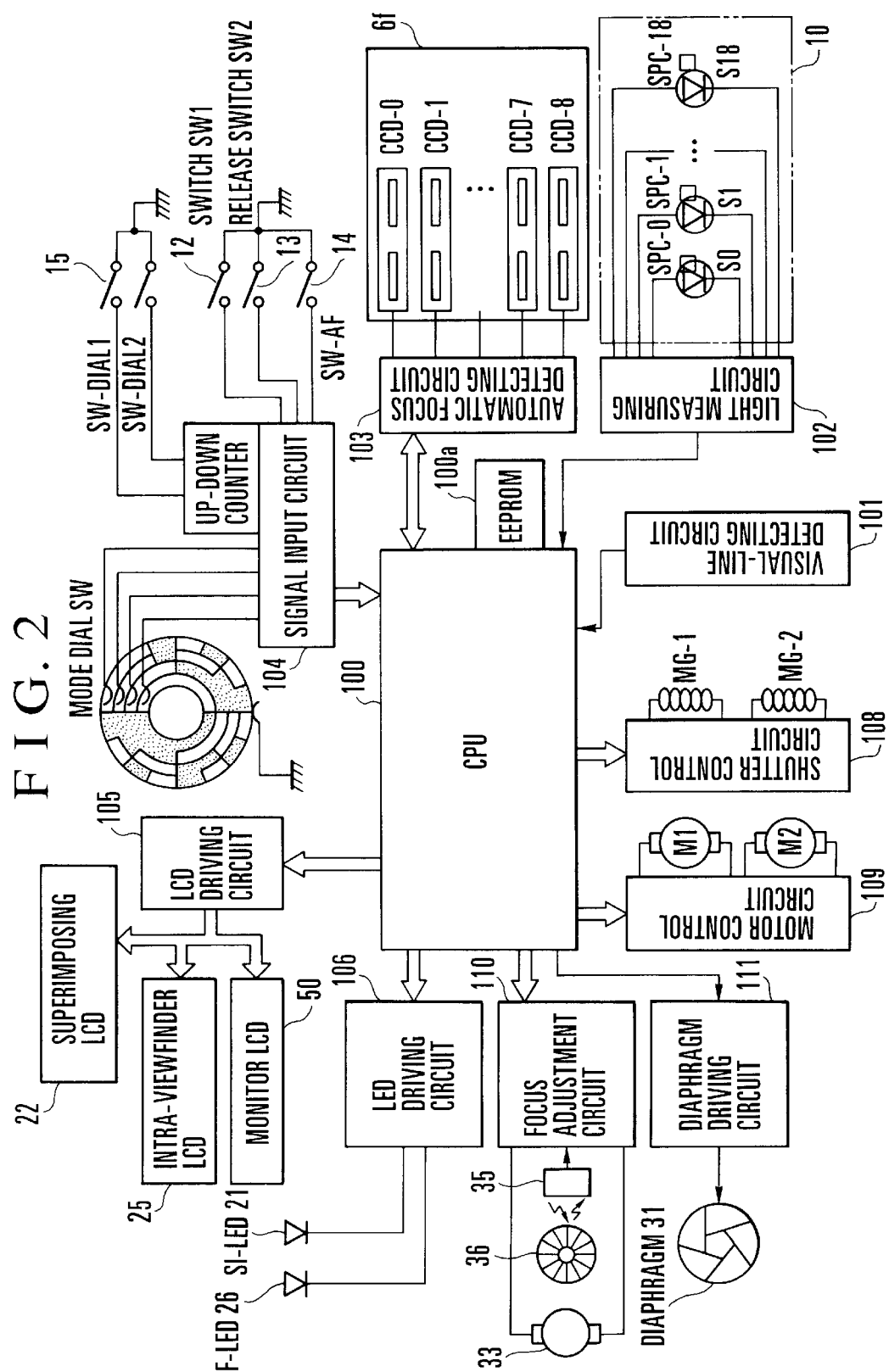
FIG. 2 is a block diagram showing the arrangement of an electric circuitry of the camera shown in FIG. 1.

FIG. 2 shows the electrical arrangement of the camera according to the first embodiment of the present invention. In FIG. 2, reference numeral 100 denotes a central processing unit (hereinafter referred to as CPU) which is a microcomputer disposed within the camera body. To the CPU 100 are connected a visual-line detecting circuit 101, a light measuring circuit 102, an automatic focus detecting circuit 103, a signal input circuit 104, an LCD driving circuit 105, an LED driving circuit 106, a shutter control circuit 108 and a motor control circuit 109. The CPU 100 is arranged to transmit signals through the mount contact 37 to the focus adjustment circuit 110 and the diaphragm driving circuit 111 which are disposed inside of the photo-taking lens 1.

The CPU 100 is provided with an EEPROM 1100a. The EEPROM 100a is arranged to store adjustment data of varied kinds therein.

The light measuring circuit 102 is arranged to receive luminance signals of the nineteen area sensors SPC-0 to SPC-18 from the light measuring sensor 10, and amplify, logarithmically compress and A/D-convert the luminance signals. After completion of these processes, signals from the light measuring sensor 10 are sent from the light measuring circuit 102 to the CPU 100 as luminance information on the sensors SPC-0 to SPC-18.

A line sensor 6f is arranged in a known manner to be composed of nine sets of line sensors CCD-0 to CCD-8, which correspond to nine focus detecting areas 70 to 78 in the viewfinder image plane. The automatic focus detecting circuit 103 is arranged to A/D convert voltage signals obtained by the line sensor 6f and to send them to the CPU 100.

A light measuring switch SW1 (12) is arranged to turn on, thereby to cause light measuring, AF and visual-line detecting actions to begin, when a release button is pushed to a first stroke position thereof. A release switch SW2 (12) is arranged to turn on when the release button is pushed to a second stroke position thereof. Dial switches SW-DIAL1 and SW-DIAL2 (15) are disposed within an electronic dial which is not shown. Signals from these switches 15 are input to an up-down counter which is arranged at the signal input circuit 104 to count a clicking amount of rotation of the electronic dial. After the signals of these switches are input to the signal input circuit 104, they are sent to the CPU 100 through a data bus. A focus detecting area selecting switch 14 is arranged to allow selection of an automatic mode or a manual mode according to an operation thereof (turning-on or turning-off).

A known LCD driving circuit 105 is arranged to simultaneously control an LCD 50 for an external monitor, the intra-viewfinder LCD (F-LCD) 25 and the superimposing LCD (SI-LCD) 22 to cause them to display an aperture value, a shutter time value, a photo-taking model etc. An LED driving circuit 106 is arranged to control and cause the F-LED 26 and the SI-LED 21 to light up or to flicker.

The shutter control circuit 108 is arranged to control a magnet MG-1 which causes a leading shutter curtain to travel when it is energized and a magnet MG-2 which causes a trailing shutter curtain to travel when it is energized, to expose a photosensitive member to a predetermined quantity of light. The motor control circuit 109 is arranged to control a motor M1 which is arranged to cause a film to be wound and rewound and a motor M2 which is arranged to move the main mirror 2 and charge the shutter 4. A sequence of release actions of the camera is carried out under the control of the shutter control circuit 108 and the motor control circuit 109.

The operation of the camera according to the first embodiment is described below with reference to FIG. 4, which is a flow chart. At step 200 in FIG. 4, with the camera set, for example, to a shutter priority automatic exposure (AE) mode from its inoperative state, the power supply of the camera turns on. At step 201, the flow of operation of the camera waits until the switch SW1 (12) is turned on by depression of the release button.

When the signal input circuit 104 detects that the release button is pushed to turn on the switch SW1 (12), the CPU 100 communicates with the photo-taking lens 1 mounted on the camera. Various pieces of information on the lens required by the camera for a light measuring action and an automatic focusing (AF) action, such as the full open F-number of the lens, the best focus position, etc., are transmitted from the lens to a memory of the camera.

At step 203, the nine sets of line sensors CCD-0 to CCD-8 begin to accumulate the light of field. The amounts of defocus (amounts of image discrepancy) DEF70 to DEF78 of the line sensors corresponding to the current photo-taking image plane are computed. A process for obtaining the amounts of defocus is known. Therefore, the details of this process are omitted from the following description.

At step 204, a check is made to find if the focus detecting area selecting switch 14 is in the automatic mode or in the manual mode. If the focus detecting area selecting switch 14 is found to be set in the automatic mode, the flow proceeds to step 205. At step 205, a focus detecting area automatic selecting subroutine is carried out to select a particular focus detecting area on the basis of the amounts of defocus DEF70 to DEF78 of the nine focus detecting areas 70 to 78.

The algorithm for automatic selection of a focus detecting area includes different methods, among which a known near-point preference algorithm which attaches weight to the central focus detecting area is advantageous for a camera of the multipoint AF type. The camera is arranged to be set into a manual focus detecting area selecting mode when the focus detecting area selecting switch 14 is turned on. This mode permits the operator, at step 206, to manually select one of the nine focus detecting areas 70 to 78 by operating the switch dial 15, as desired.

At step 207, a focus detecting area is thus set either in the automatic selecting mode or in the manual selecting mode. At step 208, a check is made to find if focus detection is possible for the set focus detecting area by causing the automatic focusing detecting circuit 103 to perform a focus detecting arithmetic operation. If not, the CPU 100 sends a signal to the LCD driving circuit 105 to cause the in-focus mark 30 of the F-LCD 25 to flicker, to let the operator know that focus detection is impossible. If focus detection is found to be possible while the focus state (an amount of defocus) for the focus detecting areas selected through the predetermined algorithm is found out of focus, the flow proceeds to step 209. At step 209, the CPU 100 sends a signal to the focus adjustment circuit 110 to cause the photo-taking lens 1 to be driven a predetermined amount.

At step 210, after the photo-taking lens 1 is thus driven, a check is made to find if the photo-taking lens 1 is in focus for the focus detecting area selected. If so, the flow proceeds to step 211. At step 211, the CPU 100 sends a signal to the LCD driving circuit 105 to cause the in-focus mark 30 of the F-LCD 25 to light up. The CPU 100 also sends a signal to the LED driving circuit 106 to make an in-focus display by lighting up a part of the SI-LED 21 corresponding to the focus detecting area which is in focus, thus lighting up a segment corresponding to the focus detecting area which is in focus. At the same time, the CPU 100 also sends a signal to the light measuring circuit 102 to measure light. Then, a light measuring arithmetic operation is carried out weighting a light measuring area corresponding to the focus detecting area which is in focus, in a manner which will be described in detail later herein. The aperture value display 29 indicative of an aperture value of the photo-taking lens 1, for example, F5.6, is displayed as a result of the arithmetic operation with segments and a decimal point.

At step 212, a check is made to find if the switch SW1 (12) is in an on-state, which indicates that the focused state for the focus detecting area and the measured light value are approved by the operator. If so, the flow proceeds to step 213 to find if the switch SW2 (13) is in an on-state. If not, the flow returns to step 212 again to make a check for its on-state.

When the switch SW2 (13) is found to be turned on, the flow proceeds to step 214. At step 214, the CPU 100 sends signals respectively to the shutter control circuit 108, the motor control circuit 109 and the diaphragm driving circuit 111. Then, the shutter control circuit 108 causes a current applied to the motor M2 to move the main mirror 2 upward to a retracted position. The diaphragm driving circuit 111 stops down the aperture position of the diaphragm 31. After that, the magnet MG1 is energized to open the leading curtain of the shutter 4. The aperture value position of the diaphragm 31 and the shutter speed of the shutter 4 are determined according to the measured light value detected by the light measuring circuit 102 and the sensitivity value of the film 5 in use.

After the lapse of a predetermined shutter time ($\frac{1}{125}$ sec, for example), the shutter control circuit 108 energizes the magnet MG2 to close the trailing curtain of the shutter 4 to bring an exposure action on the film 5 to an end. Then, the shutter control circuit 108 again energizes the magnet MG2 to move the mirror downward and to charge the shutter 4. At the same time, the motor control circuit 109 causes a current to be applied to the motor M1 to move the film 5 to an extent corresponding to one frame portion thereof. A sequence of shutter release actions then comes to an end.

After that, the flow of operation returns from step 214 to step 201 to wait until the switch SW1 (12) is again caused to turn on.

Figure 5:
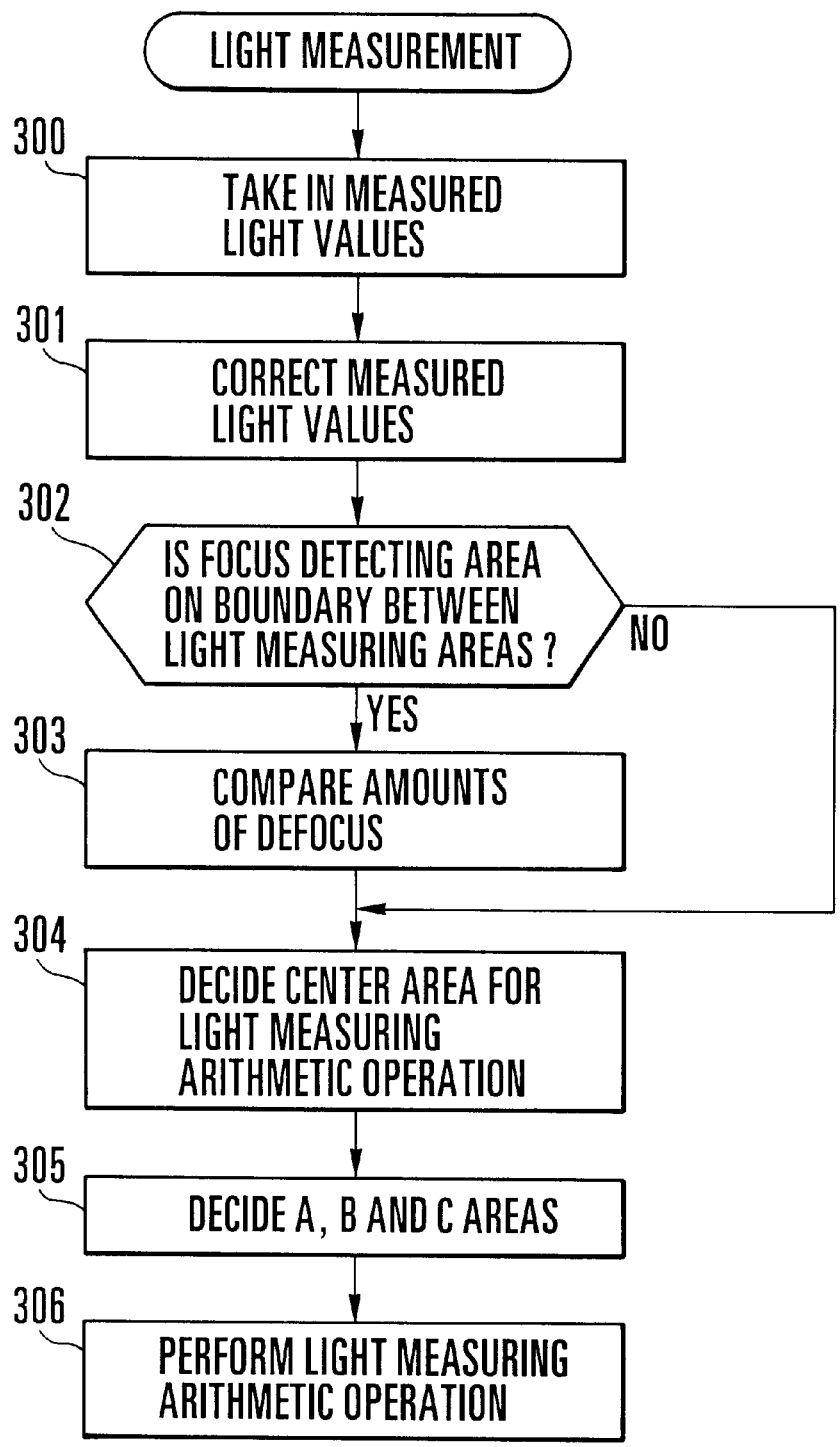
FIG. 5 is a flow chart showing light measuring arithmetic operations of the camera.

The details of the light measuring arithmetic operation of step 211 are next described referring to FIG. 5, which is a flow chart.

At step 300 in FIG. 5, for carrying out the light measuring arithmetic operation, the CPU 100 first takes in the outputs (signals for the luminance of the object) of the nineteen divided light measuring sensors from the light measuring sensor 10, and A/D (analog-to-digital) converts the outputs of these sensors.

Figure 4:
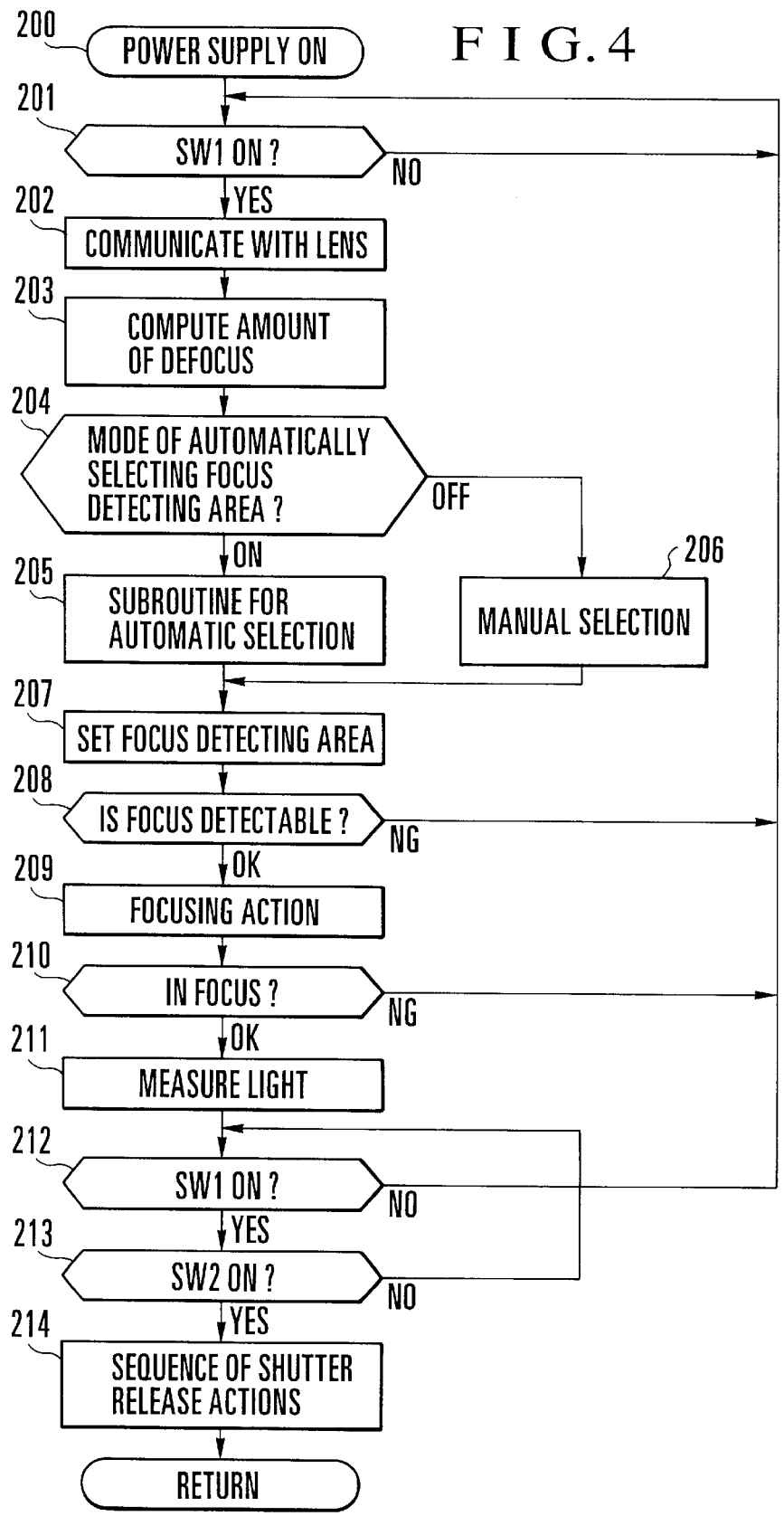
FIG. 4 is a flow chart showing a control operation on the actions of the camera.

At the next step 301, the CPU 100 corrects the A/D-converted outputs of the divided light measuring sensors on the basis of data which is the information on the photo-taking lens 1 obtained through the communication with the lens 1 at step 202 of FIG. 4. The data includes a full-open F-number, peripheral drop in light quantity, etc. As a result of the correction, corrected luminance signals S0 to S18 are obtained for the light measuring areas S0 to S8, respectively.

As mentioned in the foregoing, one of the focus detecting areas has been set at step 207 in FIG. 4 as a focus detecting area for which a focus adjusting action is to be carried out. At step 302, therefore, for the purpose of deciding a light measuring arithmetic operation to be carried out for the set focus detecting area, a check is made to find whether the set focus detecting area is in the barycenter position of a light measuring area or on a boundary between two light measuring areas. To be more specific, in a case where the focus detecting area which is set is found to be one of the focus detecting areas 70, 72, 74, 76 and 78, each of which is located in the barycenter position of a light measuring area, the flow proceeds to step 304 to determine the light measuring area which contains the set focus detecting area to be a center area for the light measuring arithmetic operation. If the set focus detecting area is found to be one of the focus detecting areas 71, 73, 75 and 77, each of which is located on the boundary between two light measuring areas, the flow proceeds to step 303.

At step 303, the amount of defocus (focus detecting state) of the set focus detecting area is compared with the amount of defocus of each of the adjacent focus detecting areas located on respective sides of the set focus detecting area. Then, a light measuring area which contains one of the adjacent focus detecting areas which has a lower difference in amount of defocus from the set focus detecting area than the other focus detecting area is determined to be the center area for the light measuring arithmetic operation (the area to be subjected to a specific weighting).

For example, assuming that the focus detecting area 73 has been set at step 207 in FIG. 4 as the focus detecting area for focus adjustment to be made, step 303 is executed in the following manner. Where the amounts of defocus of the focus detecting areas 72, 73 and 74 are expressed respectively as DEF72, DEF73 and DEF74, a difference |DEF72−DEF73| and a difference |DEF74−DEF73| are compared with each other. If the result of comparison is, for example,

|DEF72−DEF73|<|DEF74−DEF73| the light measuring area S1 containing the focus detecting area 72, which has a relatively lower amount of difference in amount of defocus from the focus detecting area 73, which should be subjected to the focus adjustment is determined to be used as the center area for the light measuring arithmetic operation.

Incidentally, even when the center area for the light measuring arithmetic operation is determined to be a light measuring area which contains a focus detecting area adjacent to the set focus detecting area, the focus adjusting action for photo-taking is performed for the set focus detecting area which has been set at step 207.

With the center area for the light measuring arithmetic operation set at step 304, the flow of operation proceeds to steps 305 and 306 to carry out the light measuring arithmetic operation, attaching the heaviest weight to the center area decided in the above-stated manner. Since one of the five light measuring areas S0 to S4 is selected at step 304, formulas to be used for the light measuring arithmetic operation can be formed in five different kinds. The following describes only a case where the light measuring area S1 is determined to be the center area. As for cases where one of the other areas S0, S2, S3 and S4 is determined to be the center area, only the final operational formulas are shown.

At step 305, the light measuring areas S0 to S18 are divided into three groups A, B and C in a shape of concentric circles with the light measuring area S1 set at the center thereof. More specifically, the light measuring area S1 is alone set as the group A. The light measuring areas S0, S3, S7 and S8, which surround the light measuring area S1, are set as the group B. The other light measuring areas S2, S4, S5, S6 and S9 to S18 are set as the group C.

At step 306, weights are respectively attached to the groups A, B and C by taking into consideration the area of each of these light measuring areas. The approximate ratio in area of the light measuring areas is as follows:

$(S0 \text{ to } S4):(S5 \text{ to } S10):(S11 \text{ to } S14):(S15 \text{ to } S18)=3:2:4:12.$ Then, according to this area ratio, the average luminance values EA1, EB1 and EC1 of the respective groups A, B and C can be expressed by the following formulas, wherein e0 to e18 represent light measuring outputs (luminance) corresponding respectively to the light measuring areas S0 to S18:

$$EA1=e1 \quad (1)$$

$$EB1=\{3(e0+e3)+2(e7+e8)\}/10 \quad (2)$$

$$EC1=\{3(e2+e4)+2(e5+e6+e9+e10)+4(e11+e12+e13+e14)+12(e15+e16+e17+e18)\}/78 \quad (3)$$

Further, where a main object is considered to be located in the group A, the light measuring action can be carried out with the greatest importance set on the luminance of the main object, attaching the heaviest weight to the group A as follows:

$$A:B:C=3:2:1$$

In view of the above, at step 306, a measured light value (exposure value) E can be obtained with the greatest importance set on the luminance of the main object according to the following formula:

$$E=(3EA+2EB+EC)/6 \text{ (unit: BV)} \quad (4).$$

Figure 6:
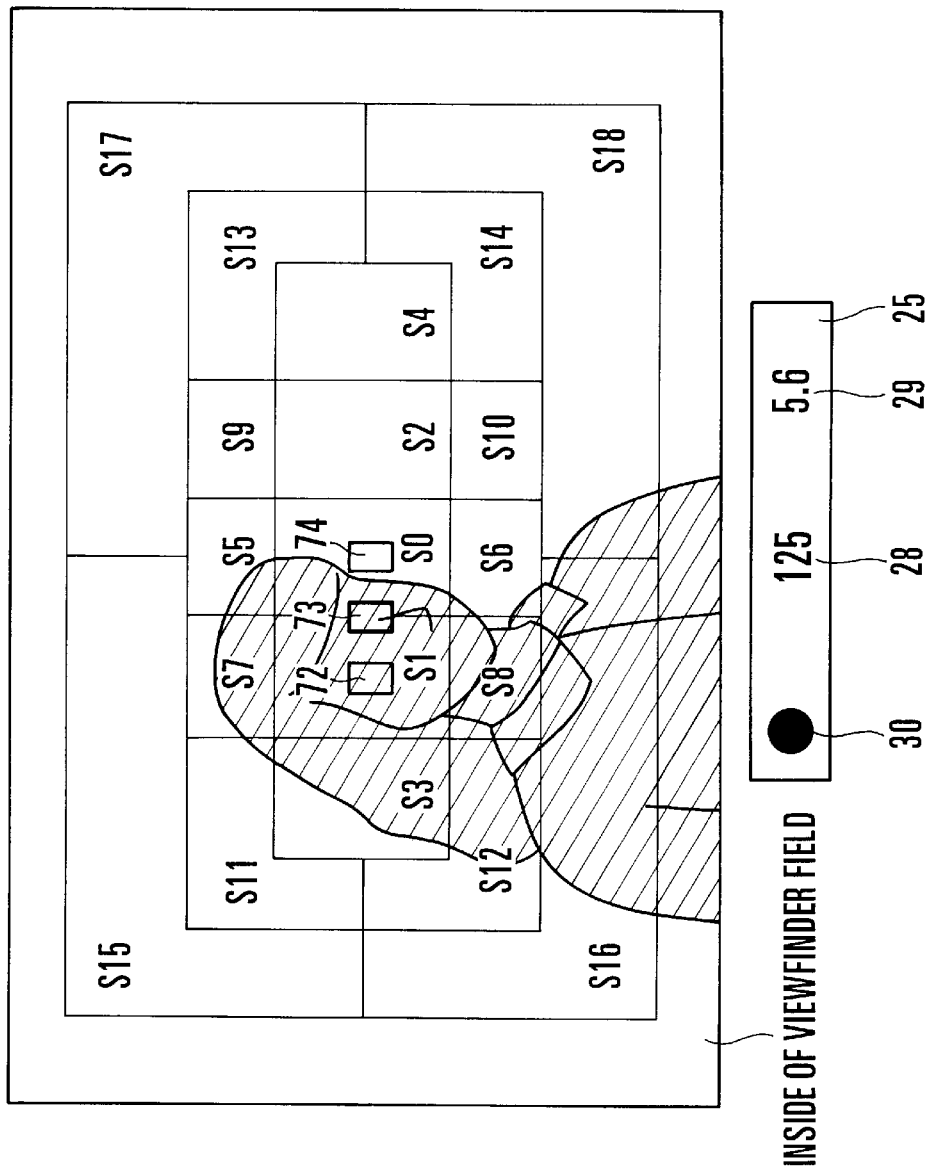
FIG. 6 shows the viewfinder field in such a state that the camera is in operation.

The light measuring arithmetic operation is further described for a case where the viewfinder field is in a state as shown in FIG. 6. Referring to FIG. 6, the focus detecting area 73 which corresponds to the center position of a face of a main photo-taking object is first selected in the automatic selection mode for focus detecting areas in the camera. The camera then performs a focus adjusting action on the photo-taking lens for the focus detecting area 73.

At this time, differences in amount of defocus from the focus detecting area 73 of the focus detecting areas 72 and 74, which are located adjacent to the focus detecting area 73, are compared with each other. As apparent from FIG. 6, the amount of defocus of the adjoining focus detecting area 72 is computed for the face position of the main object like that of the focus detecting area 73. The amount of defocus of the other adjoining focus detecting area 74 is, on the other hand, computed for the background of the main object. Hence, the center area for the light measuring arithmetic operation is decided to be the light measuring area S1 containing the focus detecting area 72 which is very close in amount of defocus to the focus detecting area 73. A light measuring arithmetic operation is thus carried out according to the formulas (1) to (4) to obtain a computed light measurement value with weight attached to the luminance of the face of the main object.

The above-stated formulas (1) to (4) of the light measuring arithmetic operation apply similarly to a case where any of the light measuring areas S0 to S4 other than the area S1 is determined to be the center area at the step 304. The computing formulas for these light measuring areas are as shown below. The formula (4) applies in common to all cases where the light measuring areas S0 to S4 are determined to be used as the center area for the light measuring arithmetic operation.

In a case where the light measuring area S0 is the center area:

$$EA0=e0$$

$$EB0=\{3(e1+e2)+2(e5+e6)\}/10$$

$$EC0=\{3(e3+e4)+2(e7+e8+e9+e10)+4(e11+e12+e13+e14)+12(e15+e16+e17+e18)\}/78$$

In a case where the light measuring are a S2 is the center area:

$$EA2=e2$$

$$EB2=\{3(e0+e4)+2(e9+e10)\}/10$$

$$EC2=\{3(e1+e3)+2(e5+e6+e7+e8)+4(e11+e12+e13+e14)+12(e15+e16+e17+e18)\}/78$$

In a case where the light measuring area S3 is the center area:

$$EA3=e3$$

$$EB3=\{3e1+4(e11+e12)\}11$$

$$EC3=\{3(e0+e2+e4)+2(e5+e6+e7+e8+e9+e10)+4(e13+e14)+12(e15+e16+e17+e18)\}/77$$

In a case where the light measuring area S4 is the center area:

$$EA4=e4$$

$$EB4=\{3e2+4(e13+e14)\}/11$$

$$EC4=\{3(e0+e1+e3)+2(e5+e6+e7+e8+e9+e10)+4(e11+e12)+12(e15+e16+e17+e18)\}/77$$

Further, if the result of comparison of the amounts of defocus made at step 303 turns out to be:

$$|DEF72-DEF73|=|DEF74-DEF73|,$$

the main object is considered to be relatively large in size. In this case, step 304 of determining the center area for the light measuring arithmetic operation is executed in the following manner. Average luminance values EA, EB and EC of the respective groups are first obtained with both the light measuring areas S0 and S1 used as the center area for the light measuring arithmetic operation according to the following formulas, before a computed light measuring value is eventually obtained according to the formula (4):

$$EA0=(e0+e1)/2$$

$$EB0\times\{3(e2+e3)+2(e5+e6+e7+e8)\}/14$$

$$EC0=\{3e4+2(e9+e10)+4(e11+e12+e13+e14)+12(e15+e16+e17+e18)\}/71.$$

Second Embodiment

Figure 7:
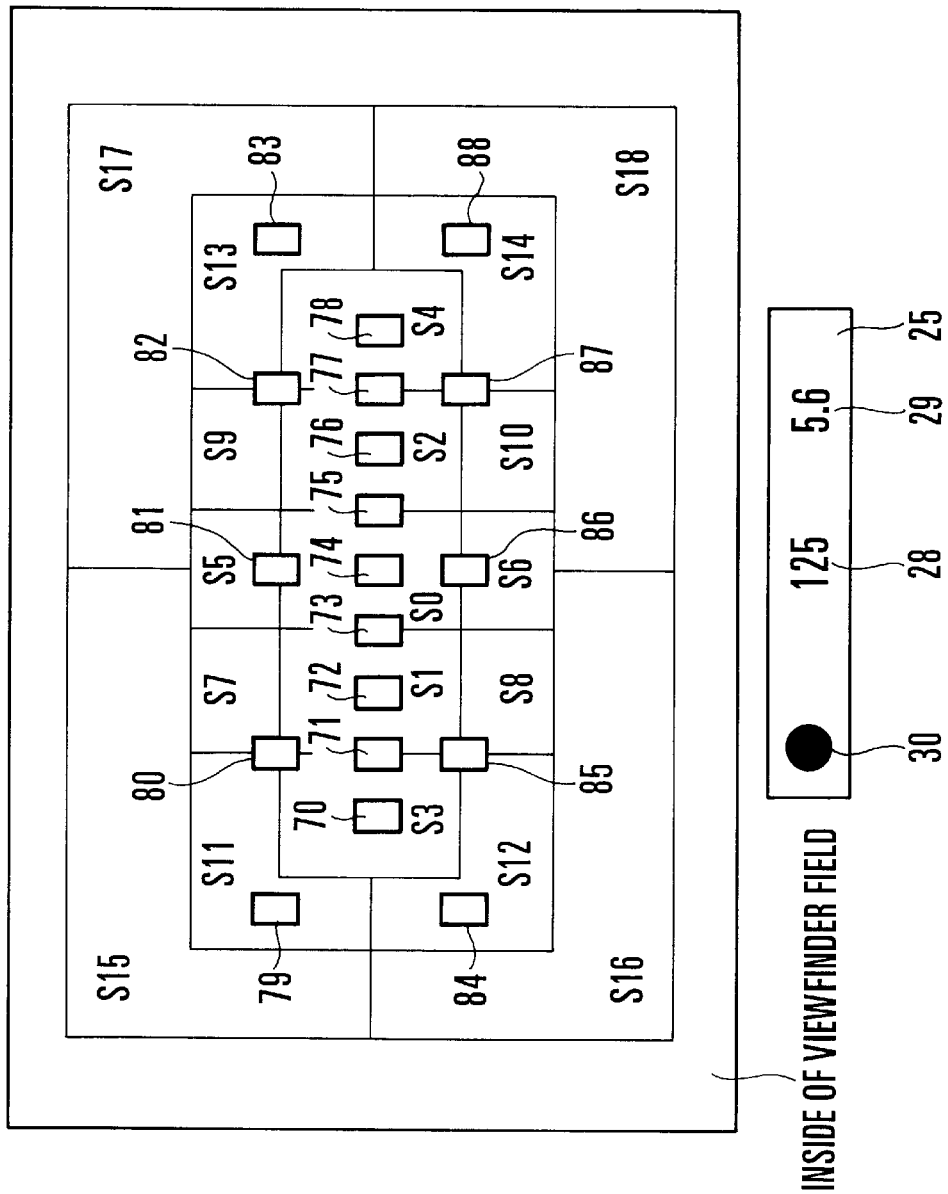
FIG. 7 shows a viewfinder field of a camera according to a second embodiment of the present invention.

FIG. 7 shows the inside of a viewfinder field of a camera according to a second embodiment of the present invention. The second embodiment is arranged in exactly the same manner as the first embodiment with respect to the basic arrangement and actions except in the following points.

Referring to FIG. 7, while the first embodiment is arranged to have nine focus detecting areas 70 to 78 as shown in FIG. 3, the second embodiment is arranged to have a total of nineteen focus detecting areas including not only the nine areas 70 to 78 disposed in the middle part of the field but also ten peripheral focus detecting areas 79 to 88 in addition to the nine areas 70 to 78. With the number of focus detecting areas increased to 19, the formulas of light measuring arithmetic operation of the second embodiment differ from those of the first embodiment.

The operability of the second embodiment is improved by the increase of the number of focus detecting areas for the operator with respect to focus adjustment. However, due to the structural arrangement of the camera, the light measuring sensor of the second embodiment is also divided into nineteen sensors in the same manner as in the case of the first embodiment. As a result, each of the focus detecting areas 80, 82, 85 and 87 is disposed on the boundary among four light measuring areas. Therefore, in a case where any of the four areas 80, 82, 85 and 87 is selected to be used as a focus detecting area, a problem arises as to how a light measuring action can be accomplished appositely to the object. In view of this, the second embodiment is arranged to carry out a light measuring arithmetic method for solving the problem. For example, assuming that the focus detecting area 80 is selected as a focus detecting area for which focusing is to be effected in the camera, the light measuring arithmetic operation of the second embodiment is performed in the following manner.

In the neighborhood of the focus detecting area 80, three light measuring areas S1, S3 and S11 respectively permit light measurement appositely to the main object as they have focus detecting areas approximately at their barycenter positions. Therefore, with the amounts of defocus of the focus detecting areas included respectively in these three light measuring areas assumed to be DEF70, DEF72 and DEF79 and the amount of defocus of the focus detecting area 80 assumed to be DEF80, a difference of each of the amounts of defocus DEF70, DEF72 and DEF79 from the amount of defocus DEF80 is computed to obtain three difference values.

If the difference |DFF72–DEF80| is found to be smaller than each of the difference |DEF70–DEF80| and the difference |DEF79–DEF80|, for example, the light measuring arithmetic operation is performed according to the formulas (1) to (4) of the first embodiment with the light measuring area S1 used as a weight attaching center.

If the difference |DEF70–DEF80| is found to be the smallest of the three difference values, the light measuring area S3 is used as the weight attaching center in the light measuring arithmetic operation. If the difference |DEF79–DEF80| is found to be the smallest, the light measuring area S11 is used as the weight attaching center in the light measuring arithmetic operation. By virtue of this arrangement, a light measuring action can be carried out with importance duly set on the luminance of the main object.

The invention is not limited to the allocations of the focus detecting areas within the viewfinder fields of the first and second embodiments disclosed.

In the case of each of the first and second embodiments disclosed, the present invention is applied to a single-lens reflex camera. However, the invention is applicable also to other kinds of cameras.

As has been described above, in a case where a selected focus detecting area, i.e., a particular focus detecting area, is located on a boundary between adjacent light measuring areas, the focus detecting states of focus detecting areas located in the neighborhood of the particular focus detecting area are compared with that of the particular focus detecting area. After the comparison, the area to be used for the light measuring arithmetic operation is determined according to the result of the comparison. Therefore, the light measuring arithmetic operation can be carried out in a manner apposite to the main object even when a relatively small number of light measuring areas are set.

Further, the arrangement for carrying out the light measuring arithmetic operation by attaching the heaviest weight to an area determined for the arithmetic operation enables the camera to carry out the light measuring arithmetic operation in an optimum manner for the whole field with a main object set at the center.

What is claimed is:

1. A camera comprising:
    a light measuring device having a plurality of light measuring areas;
    a focus detecting device having a plurality of focus detecting areas which are set at a plurality of places including a place on a boundary between the plurality of light measuring areas, said focus detecting device being arranged to select a particular focus detecting area from among the plurality of focus detecting areas; and
    a determination circuit which determines a light measuring area which is to be subjected to a specific weighting, from among the plurality of light measuring areas, by using a focus detecting state of focus detecting areas adjacent to the particular focus detecting area when the particular focus detecting area lies on the boundary between the plurality of light measuring areas,
    wherein said determination circuit determines the light measuring area which is to be subjected to the specific weighting on the basis of information on differences between the focus detecting state of the particular focus detecting area and the focus detecting states of adjacent focus detecting areas, and
    wherein said determination circuit determines, as the light measuring area which is to be subjected to the specific weighting, a light measuring area which lies adjacent the focus detecting area having the smallest one of (1) the difference between the focus detecting state of said particular focus detecting area and the focus detecting state of a first focus detecting area adjacent to said particular focus detecting area and (2) the difference between the focus detecting state of said particular focus detecting area and the focus detecting state of a second focus detecting area adjacent to said particular focus detecting area.

2. A camera according to claim 1, wherein said specific weighting includes subjecting said light measuring area determined by said determination circuit to a greater weighting than other light measuring areas.

3. A camera according to claim 1, wherein said determination circuit determines, as the light measuring area which is to be subjected to the specific weighting, each light measuring area in which a focus detecting area lies, when the difference between the focus detecting state of each focus detecting area which is adjacent to said particular focus detecting area and the focus detecting state of said particular focus detecting area is equal.

4. A camera according to claim 1, wherein said determination circuit includes a microcomputer and operates in accordance with a program.

5. A camera according to claim 1, further comprising a further determination circuit which determines the light measuring area which is to be subjected to the specific weighting, from among the plurality of light measuring areas, in accordance with a manual operation.

6. A camera according to claim 1, further comprising means for correcting a light measurement value obtained in each of the plurality of light measuring areas, on the basis of an optical characteristic.

7. A camera according to claim 1, wherein the plurality of light measuring areas are composed of light measuring areas which respectively contain the focus detecting areas and light measuring areas which do not respectively contain the focus detecting areas.

8. A camera according to claim 7, wherein each of the light measuring areas which respectively contain the focus detecting areas has a corresponding one of the focus detecting areas set substantially at a barycenter thereof.

9. A camera comprising:
    a light measuring device having a plurality of light measuring areas;
    a focus detecting device having a plurality of focus detecting areas which are set at a plurality of places including a place on a boundary between the plurality of light measuring areas, said focus detecting device being arranged to select a particular focus detecting area from among the plurality of focus detecting areas; and
    a light measuring circuit that performs a light measuring operation in accordance with a light measuring algorithm, said light measuring circuit varying the light measuring algorithm when the particular focus detecting area selected by said focus detecting device lies on the boundary between the plurality of light areas.

10. A camera according to claim 9, wherein said light measuring circuit performs a light measuring calculation which gives a weighting to the light measured value of the light measuring area corresponding to one focus detecting area adjacent to the particular focus detecting area when the particular focus detecting area selected by said focus detecting device lies on the boundary between the plurality of light measuring areas, and said light measuring circuit performs a light measuring calculation which is subjected to a weighting on the light measured value of the light measuring area corresponding to the particular focus detecting area when the particular focus detecting area does not lie on the boundary between the plurality of light measuring areas.

11. A camera according to claim 10, further comprising:
    a decision circuit that determines a light measuring area on the basis of respective focus detecting states of focus detecting areas adjacent to the particular focus detecting area selected by said focus detecting device when the particular focus detecting area lies on the boundary between the plurality of light measuring areas,
    wherein said light measuring circuit performs the light measuring calculation which gives a weighting to the light measuring value of the light measuring area.

\* \* \* \* \*

UNITED STATES PATENT AND TRADEMARK OFFICE
CERTIFICATE OF CORRECTION

PATENT NO.    : 6,670,992 B2
DATED         : December 30, 2003
INVENTOR(S)   : Yoshiaki Irie It is certified that error appears in the above-identified patent and that said Letters Patent is hereby corrected as shown below:

Title page,
Item [57], ABSTRACT,
Line 11, "off" should read -- of --.

Column 1,
Line 43, "is" should read -- are --.

Column 3,
Line 32, "; and" should read -- and --.

Column 4,
Line 55, "(see," should read -- (see --.

Column 5,
Line 13, "1100a." should read -- 110a. --.

Column 7,
Line 57, "S0 to S18" should read -- $_e0$ to $_e18$ --.
Line 59, "S8," should read -- S18, --.

Signed and Sealed this

Sixth Day of July, 2004

JON W. DUDAS
*Acting Director of the United States Patent and Trademark Office*